US009132780B2

(12) United States Patent
Sautter, Jr. et al.

(10) Patent No.: US 9,132,780 B2
(45) Date of Patent: Sep. 15, 2015

(54) LADDER RACK SYSTEM

(75) Inventors: Robert H. Sautter, Jr., Cement City, MI (US); Thomas S. Richter, Sand Creek, MI (US)

(73) Assignee: Adrian Steel Company, Adrian, MI (US)

( * ) Notice: Subject to any disclaimer, the term of this patent is extended or adjusted under 35 U.S.C. 154(b) by 0 days.

(21) Appl. No.: 14/002,872

(22) PCT Filed: Mar. 5, 2012

(86) PCT No.: PCT/US2012/027783
§ 371 (c)(1),
(2), (4) Date: Sep. 3, 2013

(87) PCT Pub. No.: WO2012/122130
PCT Pub. Date: Sep. 13, 2012

(65) Prior Publication Data
US 2013/0334267 A1    Dec. 19, 2013

Related U.S. Application Data

(60) Provisional application No. 61/449,385, filed on Mar. 4, 2011.

(51) Int. Cl.
*B60R 9/042*   (2006.01)
*B60R 9/048*   (2006.01)
*B60R 9/04*    (2006.01)

(52) U.S. Cl.
CPC ................ *B60R 9/04* (2013.01); *B60R 9/0423* (2013.01); *B60R 9/048* (2013.01); *B60R 9/0485* (2013.01)

(58) Field of Classification Search
CPC ........................... B60R 9/0423; B60R 9/0485
See application file for complete search history.

(56) References Cited

U.S. PATENT DOCUMENTS

| 3,013,681 | A  | * | 12/1961 | Garnett ............................. 280/4 |
| 4,473,176 | A  | * | 9/1984  | Harper ........................... 224/569 |
| 5,058,791 | A  | * | 10/1991 | Henriquez et al. ............. 224/310 |
| 5,687,813 | A  |   | 11/1997 | Bensch |
| 6,179,543 | B1 |   | 1/2001  | Adame et al. |
| 6,427,889 | B1 | * | 8/2002  | Levi .............................. 224/315 |
| 2003/0020312 | A1 |   | 1/2003  | Wang |
| 2003/0175101 | A1 | * | 9/2003  | Levi .............................. 414/462 |
| 2004/0026472 | A1 | * | 2/2004  | Foo et al. ....................... 224/310 |
| 2004/0131456 | A1 |   | 7/2004  | Henderson et al. |

(Continued)

OTHER PUBLICATIONS

International Search Report dated Jun. 19, 2012; 2 pages.

*Primary Examiner* — Justin Larson
(74) *Attorney, Agent, or Firm* — Butzel Long

(57) ABSTRACT

A ladder rack includes: a frame assembly mountable on a vehicle, the frame assembly having at least two cross bows each including a principal length extending between opposite first and second ends; a pivot bracket pivotally coupled to the first ends of each cross bow, each pivot bracket adapted to support one side rail of a ladder, and each pivot bracket being pivotally moveable between a first position corresponding to the stowage position and a second position corresponding to the loading/unloading position; a stationary bracket disposed on each cross bow intermediate the first and second ends thereof, each stationary bracket adapted to abut another side rail of a ladder in the stowage position; a torsion bar interconnecting the pivot brackets; and a manually operable handle coupled to one of the torsion bar or a pivot bracket for moving the pivot brackets between the stowage position and the loading/unloading position.

20 Claims, 8 Drawing Sheets

(56) References Cited

U.S. PATENT DOCUMENTS

| | | |
|---|---|---|
| 2005/0079036 A1 | 4/2005 | Richter |
| 2005/0139559 A1 | 6/2005 | Trusty et al. |
| 2006/0185933 A1* | 8/2006 | Thibault .................. 182/127 |
| 2006/0245875 A1 | 11/2006 | Hendley et al. |
| 2009/0140021 A1 | 6/2009 | Richter et al. |
| 2011/0214944 A1* | 9/2011 | Levi .......................... 182/127 |

* cited by examiner

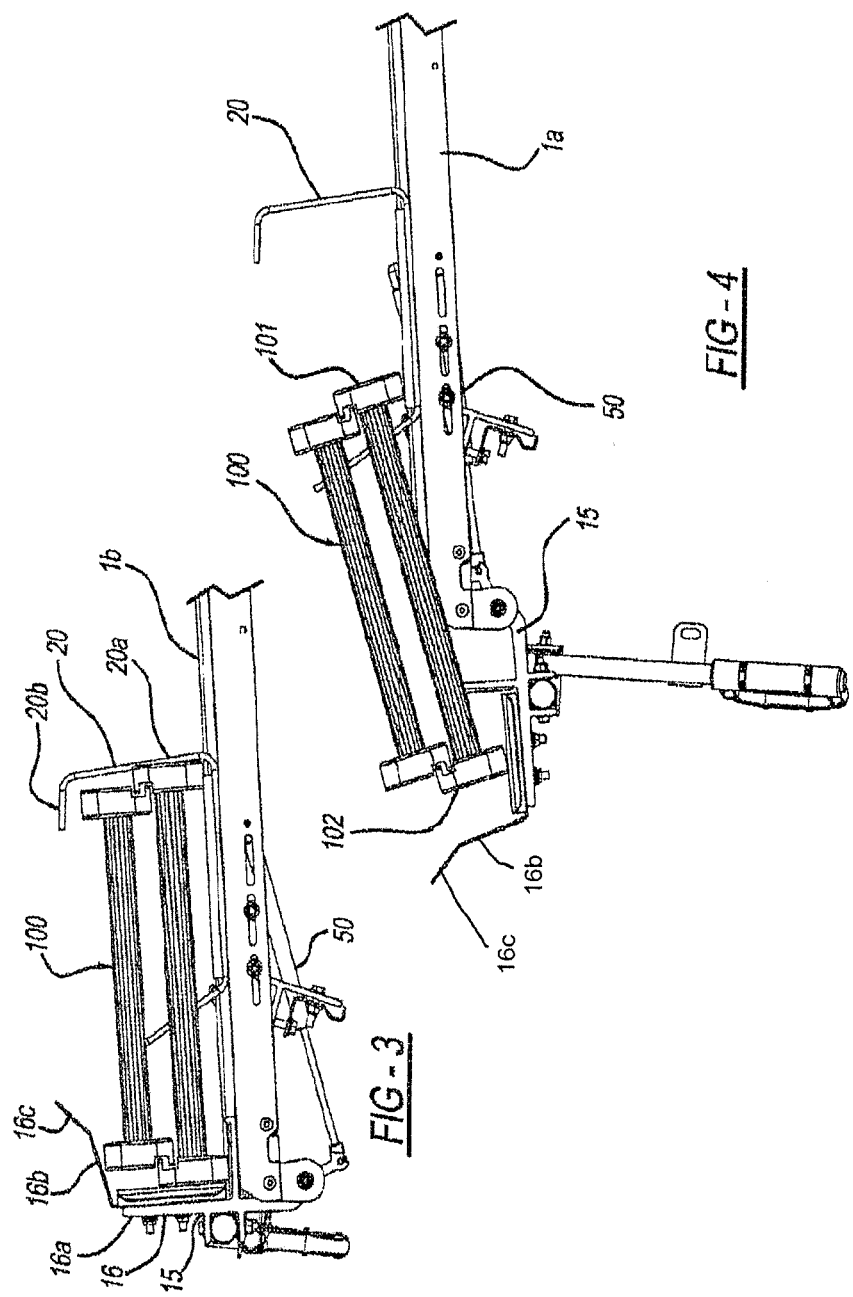

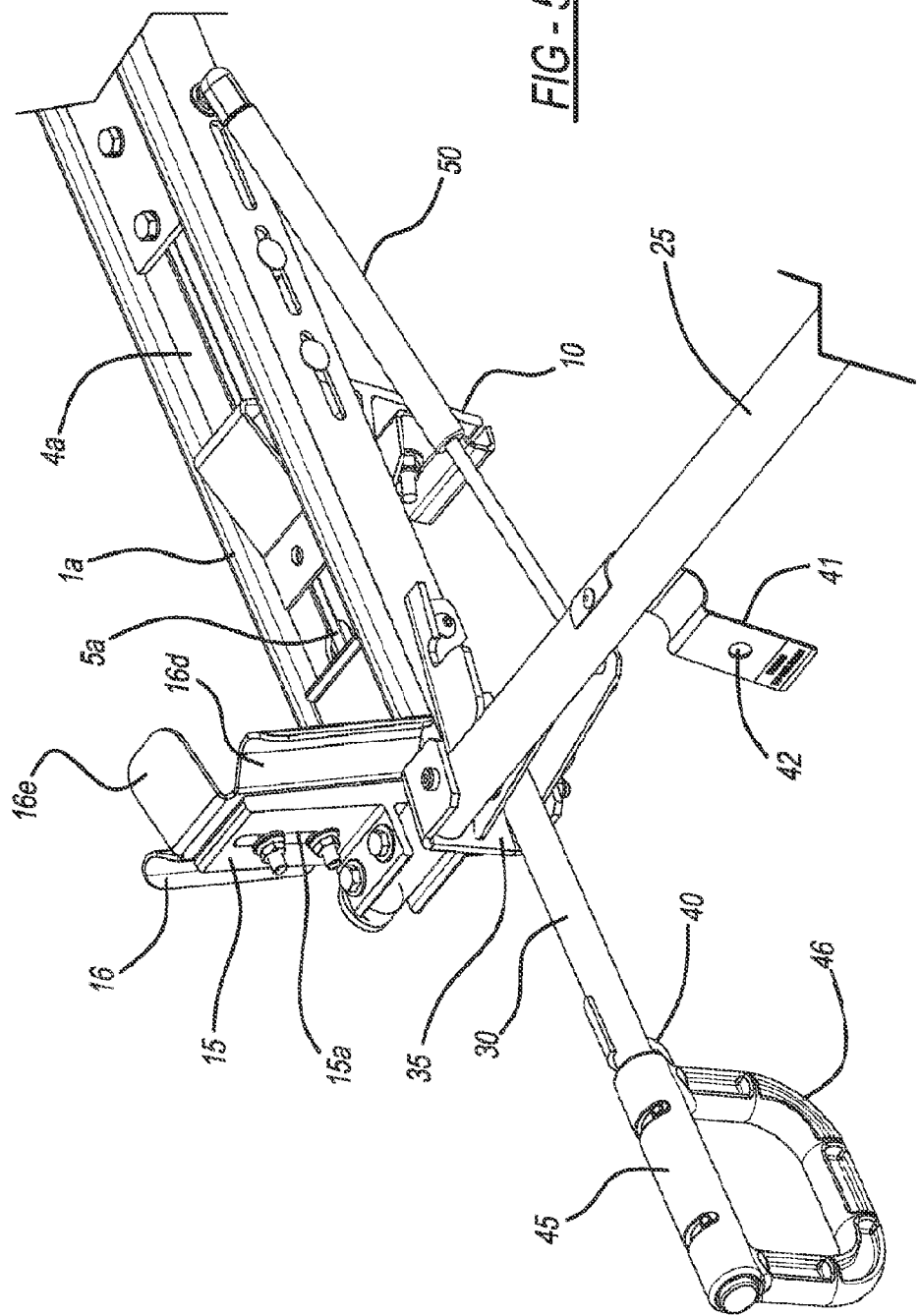

LADDER RACK SYSTEM

CROSS REFERENCE TO RELATED APPLICATIONS

This application claims the benefit of and priority to U.S. provisional patent application Ser. No. 61/449,385 having a filing date of Mar. 4, 2011, and PCT application number PCT/US2012/027783 having a filing date of Mar. 5, 2012, which are hereby incorporated by reference in their entireties.

BACKGROUND

The present invention relates generally to a ladder rack, and more particularly to an apparatus and method for loading and unloading ladders onto/from vehicles.

Ladders and sometimes other large pieces of equipment are often transported by motor vehicles, such as utilizing racks mounted to the roofs of service or work vehicles, including vans and trucks. The loading and unloading of ladders and other equipment from roof-mounted racks requires awkward lifting of heavy, cumbersome ladders which may result in damage to vehicles and ladders or strain and injury to persons attempting to load or unload the ladders.

Numerous devices have been developed and used for receiving and securely storing ladders for various purposes including stationary storage or for transportation. Such devices address a number of considerations that are unique to storing and securing ladders. For example, since most ladders are bulky and long regardless of their weight, it is difficult to store a ladder in many locations, particularly upon vehicle roofs. Moreover, the large size and heavy weight of many ladders can make ladder lifting, manipulation, and other movement during storage a difficult and dangerous process. Several ladder racks have been developed to address these problems. However, such ladder racks are typically complex, expensive, and bulky.

Although the storage of ladders in any situation involves some challenge, vehicular applications are particularly problematic. Many conventional vehicle ladder racks require the user to lift the ladder some distance to place the ladder on the rack. This process can be difficult especially when only one person is trying to lift and manipulate a heavy and/or long ladder onto a ladder rack. Other vehicle ladder racks require manipulation of the ladder itself after a ladder has been loaded on the rack. Such ladder racks are designed to provide for ladder storage on top of a vehicle or otherwise in a high position on the vehicle. The additional weight of the portion of the ladder rack that has to be manipulated together with the weight of the ladder after a ladder has been loaded thereon increases the total weight that a user of the rack has to manipulate.

Thus, there is a need for a ladder rack that can be used in vehicular applications that is easy to use and provides for easy ladder loading/unloading and access. Further, there is a need for a ladder rack that can be easily manipulated to move a ladder between ladder storage and loading/unloading positions.

SUMMARY

Accordingly, the present disclosure comprehends a vehicle ladder rack for supporting a ladder in a stowage position, and for moving the ladder between the stowage position and a loading/unloading position from which a ladder can be loaded onto, or unloaded from, the rack. The ladder rack includes a frame assembly mountable on a vehicle, and the frame assembly includes at least two cross bows each having a principal length extending between opposite first and second ends. The frame assembly also includes a pivot bracket pivotally coupled to the first ends of each cross bow, and each pivot bracket is adapted to support one side rail of a ladder. Each pivot bracket is pivotally moveable between a first position corresponding to the stowage position and a second position corresponding to the loading/unloading position. The frame assembly includes a stationary bracket disposed on each cross bow intermediate the first and second ends thereof, and each stationary bracket adapted to abut another side rail of a ladder in the stowage position. A torsion bar interconnects the pivot brackets. The frame assembly further includes a manually operable handle coupled to one of the torsion bar or a pivot bracket for moving the pivot brackets between the stowage position and the loading/unloading position.

An advantage of the present disclosure relates to the ease of placing a ladder on the ladder rack by one person. Another advantage of the present disclosure is that a user may manipulate a ladder more efficiently. A further advantage of the present disclosure relates to the adjustability of the ladder once it is placed on the ladder rack.

Other features and advantages of the present disclosure will become readily appreciated based upon the following description when considered in conjunction with the accompanying drawings.

BRIEF DESCRIPTION OF THE DRAWINGS

FIG. 3 is a perspective view of the ladder rack, with a ladder, in a stowage position;

FIG. 4 is a perspective view of the ladder rack, with a ladder, in a loading/unloading position;

FIG. 5 is a perspective view of the ladder rack illustrating a handle and pivot bracket;

DESCRIPTION

Figure 1:
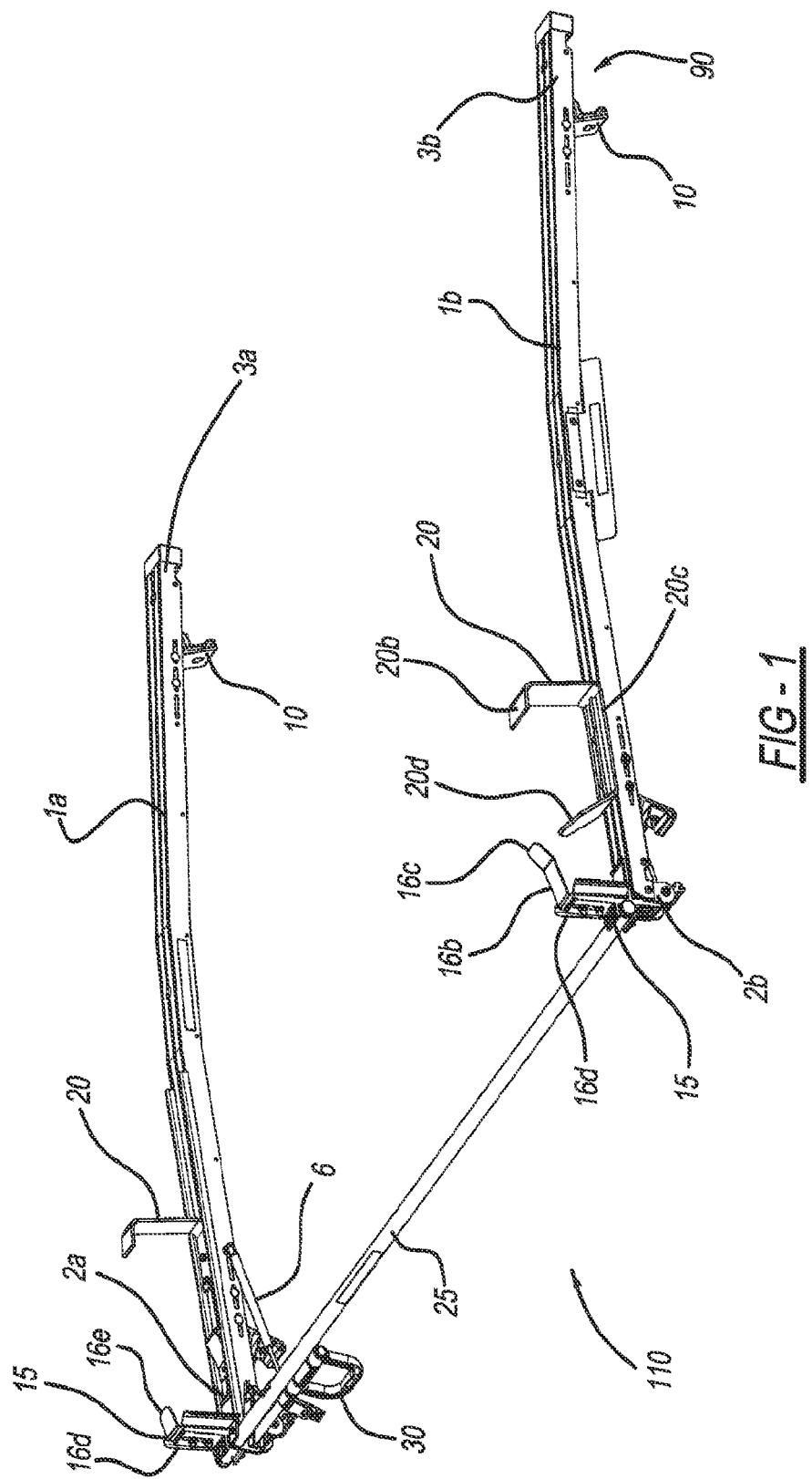
FIG. 1 is a perspective view of a ladder rack in a stowage position.
Figure 2:
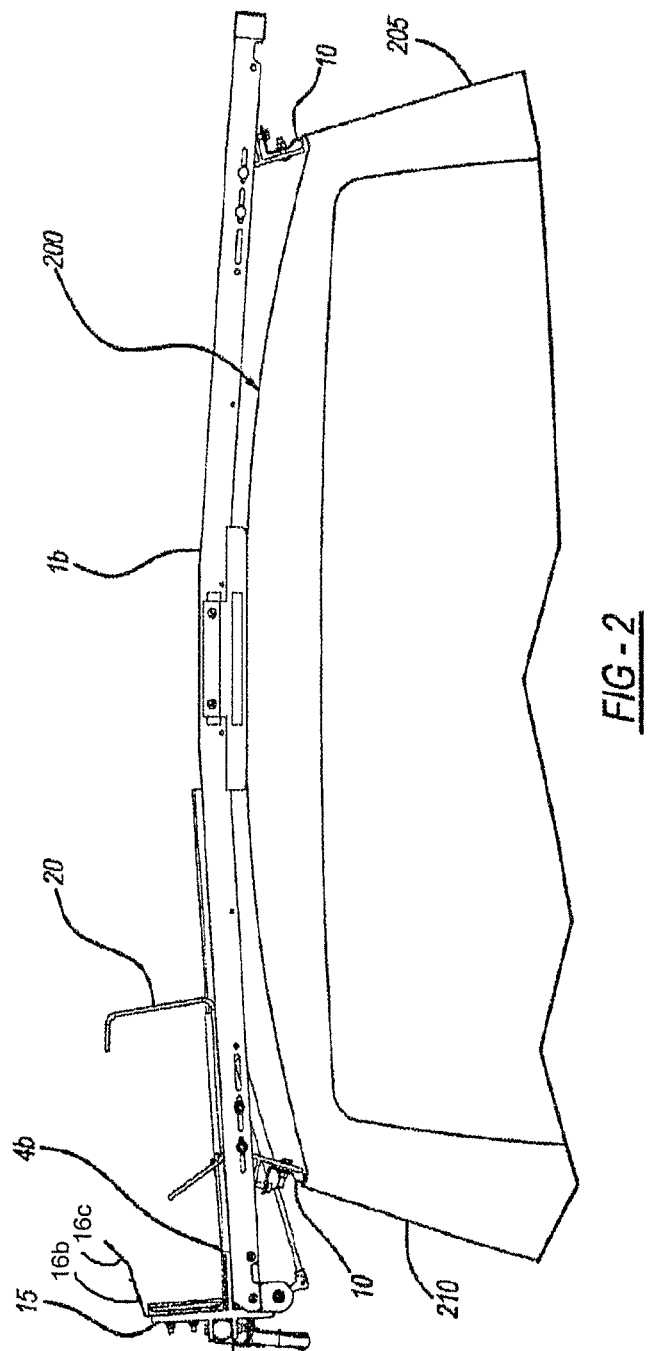
FIG. 2 is a cross-sectional view of the ladder rack of FIG. 1 on a vehicle body in a stowage position.

Referring now to FIGS. 1-4, a vehicle ladder rack 110 is illustrated that provides for supporting a ladder 100 in a stowage position, and moving the ladder 100 easily between the stowage position (e.g., FIG. 3) and a loading/unloading position (e.g., FIG. 4) at which the ladder 100 can be loaded onto the rack 110 or unloaded from the rack 110.

The ladder rack of the present application may be used in any application or environment, but has particular advantages when used on a vehicle. Accordingly, although the rack 110 in the accompanying figures and described hereinafter is for a vehicular application, it should be noted that this application is presented by way of example only, and does not indicate or imply that the present application is limited to vehicular applications. Similarly, the ladder rack of the present application is illustrated and described for use on a vehicle which may include a car, van, truck, or the like.

The vehicle ladder rack includes a frame assembly 90 mountable on a vehicle 200, the frame assembly 90 having at least two cross bows 1a, 1b, each having a principal length extending between opposite first 2a, 2b and second 3a, 3b ends. In an example, the opposite first 2a, 2b and second 3a, 3b ends are situated beyond respective sidewalls 205, 210 of the vehicle 200.

Cross bows 1a, 1b are mountable to a vehicle 200, such as the vehicle roof, as shown, by means of brackets 10 or the like. Cross bows 1a, 1b may be fashioned from any suitable material, although in the illustrated example cross bows 1a, 1b are formed from metal, and more particularly from aluminum. In an example, the cross bows 1a, 1b extend across the roof of a vehicle 200.

Figure 9:
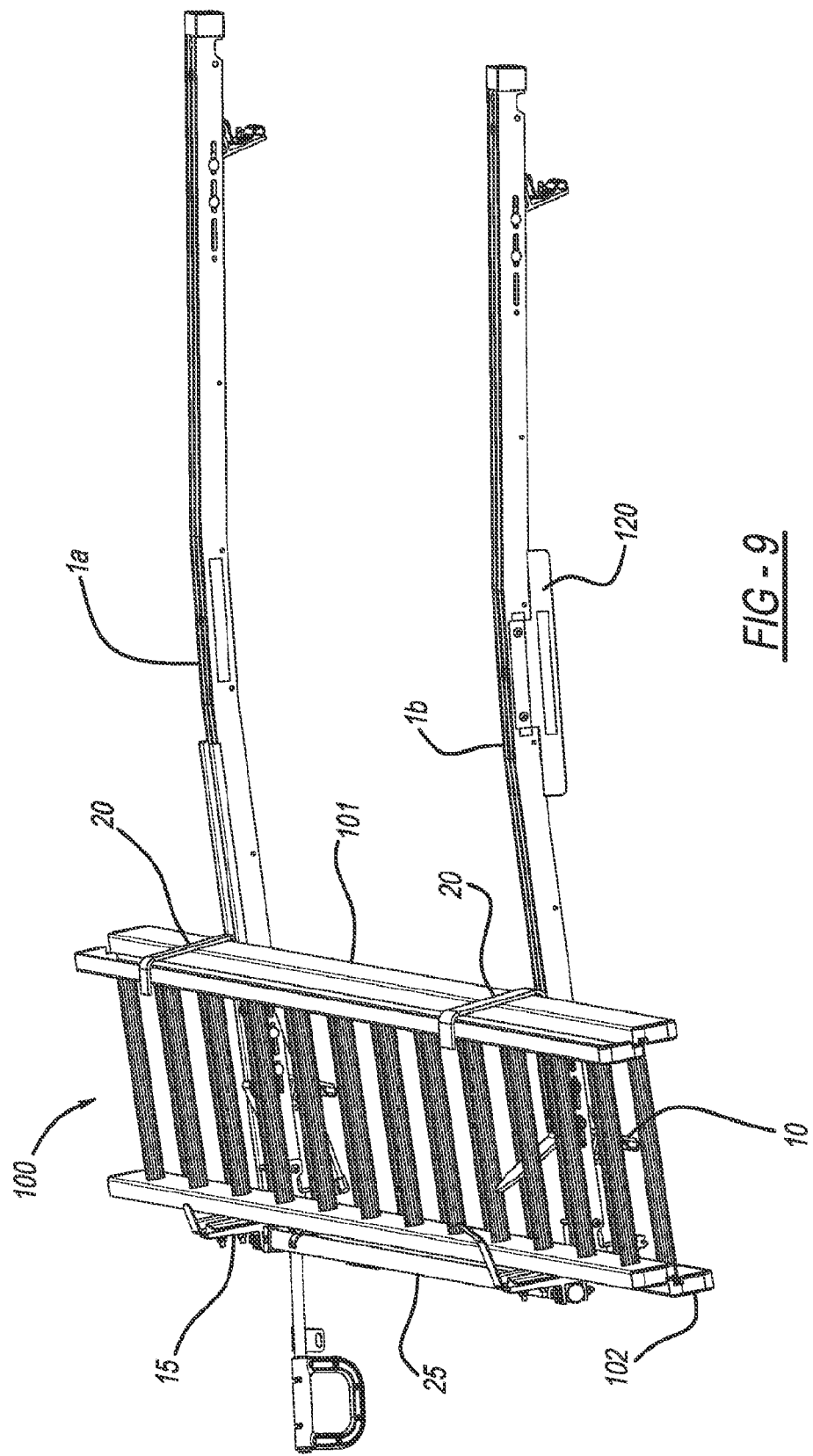
FIG. 9 is a perspective view of the ladder rack in a stowage position.

The cross bows may be mounted to the vehicle using a securement feature 120. In the example of at least FIG. 9, the securement feature 120 is fixedly secured to a central portion of the cross bows 1a, 1b and the roof of the vehicle 200. The securement feature 120 may be secured to the cross bows 1a, 1b using a fastener such as a screw, nut/bolt, or the like. The cross bows 1a, 1b preferably have a shape that generally conforms to the shape of the roof of a vehicle and are positioned at a distance above the roof to provide adequate clearance for objects that are to be stored on the ladder rack 110.

Although two cross bows 1a, 1b are illustrated in this example, it should be appreciated that various numbers of cross bows may be mounted on the roof of a vehicle or on other portions of a vehicle. It may be possible to mount the ladder rack 110 to vehicles such as trucks, including pick-up trucks and flatbed trucks that do not have roofs which extend beyond the cab of such vehicles.

Optionally, each cross bow 1a, 1b includes a sliding track 4a, 4b (identical track 4b not shown) therein (FIG. 5). As shown, each sliding track 4a, 4b further defines therein an elongate slot 5a, 5b (identical slot 5b not shown) which permits the securement, via a fastener such as nuts/bolts, for instance, of various optional hardware within the sliding tracks 4a, 4b. The elongate slot 5a, 5b may extend along a single portion, multiple portions, or an entirety of one or both of the sliding tracks 4a, 4b. Further, and also optionally, the foregoing construction permits the stationary brackets 20 to be adjustably positioned along the length of each cross bow 1a, 1b to accommodate ladders of varying widths.

The ladder assembly also includes a pivot bracket 15 which is pivotally coupled to the first ends 2a, 2b of each cross bow 1a, 1b. Each pivot bracket 15 is adapted to support one side rail of a ladder (as shown in FIGS. 3 and 4), and each pivot bracket 15 being pivotally moveable between a first position (shown in FIG. 3) corresponding to the stowage position and a second position (shown in FIG. 4) corresponding to the loading/unloading position. In an example, the pivot bracket 15 has a direction which is essentially perpendicular to the cross bows 1a, 1b during the first position, and the pivot bracket 15 extends in an essentially horizontal direction to the cross bows 1a, 1b during the second position. It is to be understood that various configurations of pivot brackets 15 can be incorporated and used in the ladder rack system 110 of the present application.

In an example, the pivot bracket may include a pivot bracket receiving portion 15a which allows for the secured attachment of a ladder grip 16. As the pivot bracket receiving portion 15a extends along a portion of the pivot bracket 15, the ladder grip 16 may be variably positioned to accommodate variously sized ladders.

The ladder grip 16 in an example may include a base 16a, a first ladder grip portion 16b, a second ladder grip portion 16c, and a pair of wings 16d. The ladder grip base 16a couples to the pivot bracket 15 via the pivot bracket receiving portion 15a. The first ladder grip portion 16b extends from an end portion of the ladder grip base 16a in a first upward direction above a ladder 100 situated in a storage position. The second ladder grip portion 16c extends in a second upward direction above the ladder 100 situated in the storage position. In this example, the second upward direction may have a greater vertical angle than the first upward direction in relation to the base 16a. The ladder grip 16 may additionally include a pair of wings 16d which extend in an upward direction from respective longitudinal end portions of the ladder grip base 16a. The ladder grip base 16a may extend in a same direction as the pivot bracket 15.

In another example, the ladder grip 16 may include a base 16a, an extended ladder grip portion 16e, and a pair of wings 16d. The ladder grip base 16a couples to the pivot bracket 15 via the pivot bracket receiving portion 15a. The extended ladder grip portion 16e extends from an end portion of the ladder grip base 16a in an upward direction above a ladder 100 situated in a storage position. The ladder grip 16 may additionally include a pair of wings 16d which extend in an upward direction from respective longitudinal end portions of the ladder grip base 16a. The ladder grip base 16a may extend in a same direction as the pivot bracket 15.

Each pivot bracket 15 may be provided with suitable padding to prevent unwanted damage to the ladder being supported by the ladder rack.

To abut the opposing side rail of a ladder in the stowage position (see FIG. 3), stationary brackets 20 are disposed on each cross bow 1a, 1b intermediate the first 2a, 2b and second 3a, 3b ends thereof. The stationary bracket 20 may include a stationary bracket first portion 20a and a stationary bracket second portion 20b. The stationary bracket first portion 20a may extend in an upward direction from a respective cross bow 1a, 1b. The stationary bracket second portion 20b may be detachable or integrally formed with the stationary bracket first portion 20a and extend in a direction above a ladder 100 situated in a storage position.

In another example, the stationary bracket 20 may include a stationary bracket first portion 20a, a stationary bracket second portion 20b, a stationary bracket base 20c, and a stationary bracket grip 20d. The stationary bracket first portion 20a may extend in an upward direction from a first end of the stationary bracket base 20 which is coupled to a respective cross bow 1a, 1b. The stationary bracket second portion 20b may be detachably or integrally formed with the stationary bracket first portion 20a and extend in a direction above a ladder 100 situated in a storage position. The stationary bracket grip 20d may extend in an upward direction toward the first end 2a, 2b of the cross bow 1a, 1b. The stationary bracket grip 20d may be covered or coated with a polymeric material or a resilient deformable material such as rubber or urethane pieces or foam to increase gripping strength. In addition the cover or coating can be textured, ribbed, dimpled, grooved, curved, or otherwise shaped to prevent slippage.

As noted, each stationary bracket 20 is optionally adjustably secured, such as via nuts/bolts, within the optional sliding track 4a, 4b of cross bows 1a, 1b, thereby permitting the position of each stationary bracket 20 along the length of each cross bow 1a, 1b to be selectively adjusted to accommodate ladders of differing widths. Each stationary bracket 20 may also be provided with suitable padding to prevent unwanted damage to the ladder being supported by the ladder rack.

As best shown in FIGS. 1 and 5, a torsion bar 25 interconnects the pivot brackets 15. This may be accomplished by bolting the ends of the torsion bar 25 to each pivot bracket, as depicted in FIG. 5, although other fasteners or fastening means may be employed.

Finally, a manually operable handle 30 coupled to one of the torsion bar 25 or a pivot bracket 15 is provided for moving the pivot brackets 15 between the stowage position and the loading/unloading position. In the illustrated example, handle 30 may best be seen in FIG. 5 to be pivotally mounted on a bracket 35 secured, in turn, to the torsion bar 25. According to this mounting arrangement, handle 30 may be pivotally moved between a stowage position (shown in FIG. 5), in which handle 30 is disposed generally parallel to the torsion bar 25, and a deployed position (shown in FIG. 6), in which handle 30 projects generally outwardly away from torsion bar 25. In the deployed position, as will be appreciated, handle 30 may be manually grasped by a user and manipulated to rotate torsion bar 25 and, in turn, pivotally move the pivot brackets 15 between the first and second positions thereof.

Optionally in order to secure the handle 30 in the stowage position thereof, there is provided on the torsion bar 25 a generally C-shaped bracket or clamp 40 dimensioned to receive and removably capture therein a portion of the handle 30 as shown in FIG. 5. In the illustrated example, clamp 40 further comprises a pair of opposed tabs 41 proximate the clamp opening, each tab including a bore 42 therethrough for receiving a pin 45 that, once positioned through bores 42, serves to prevent the removal of handle 30 from clamp 40. Pin 45 may, as shown, be tethered to the torsion bar 25 to prevent its loss, and may further include a latch 46 which can be selectively attached to the free end of pin 45 in order to further secure the pin 45 in position through the bores 42. Additional means such as cable, cable locks, safety straps, lock hasps, etc. can be used to further secure the ladder to the ladder rack 110 of the present application.

As shown in FIGS. 3 and 4, at least one spring 50 interconnects each of a cross bow 1a, 1b and a pivot bracket 15, the at least one spring 50 biases the pivot bracket 15 to the first position thereof. Spring 50 may be a gas spring, as shown, or another type of conventional spring.

Figure 6:
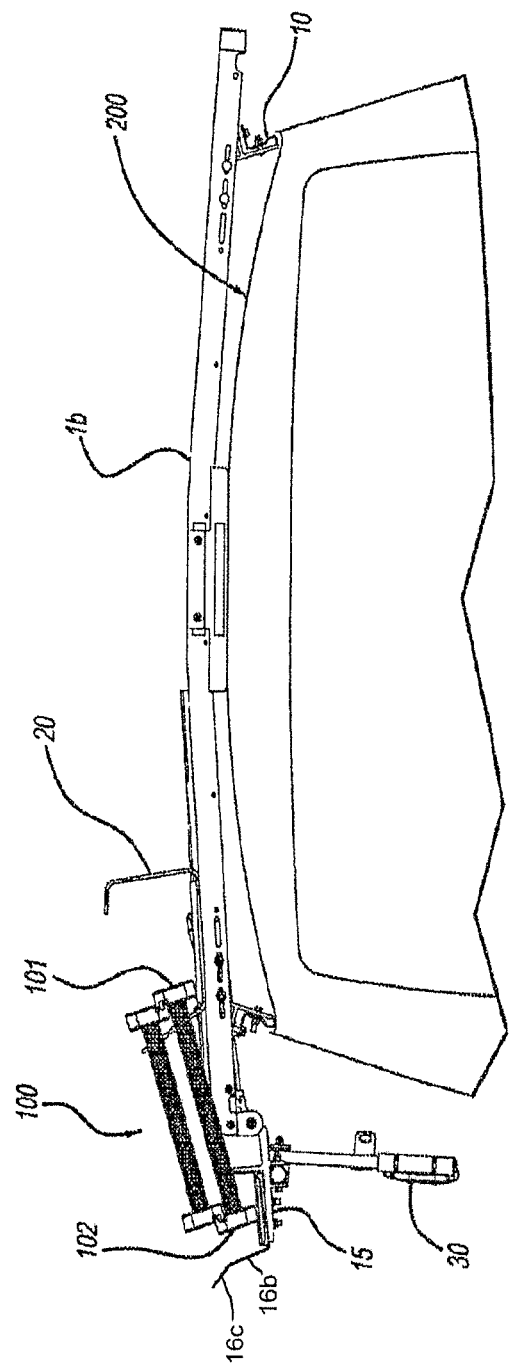
FIG. 6 is a cross-sectional view of the ladder rack on a vehicle body in a loading/unloading position.
Figure 7:
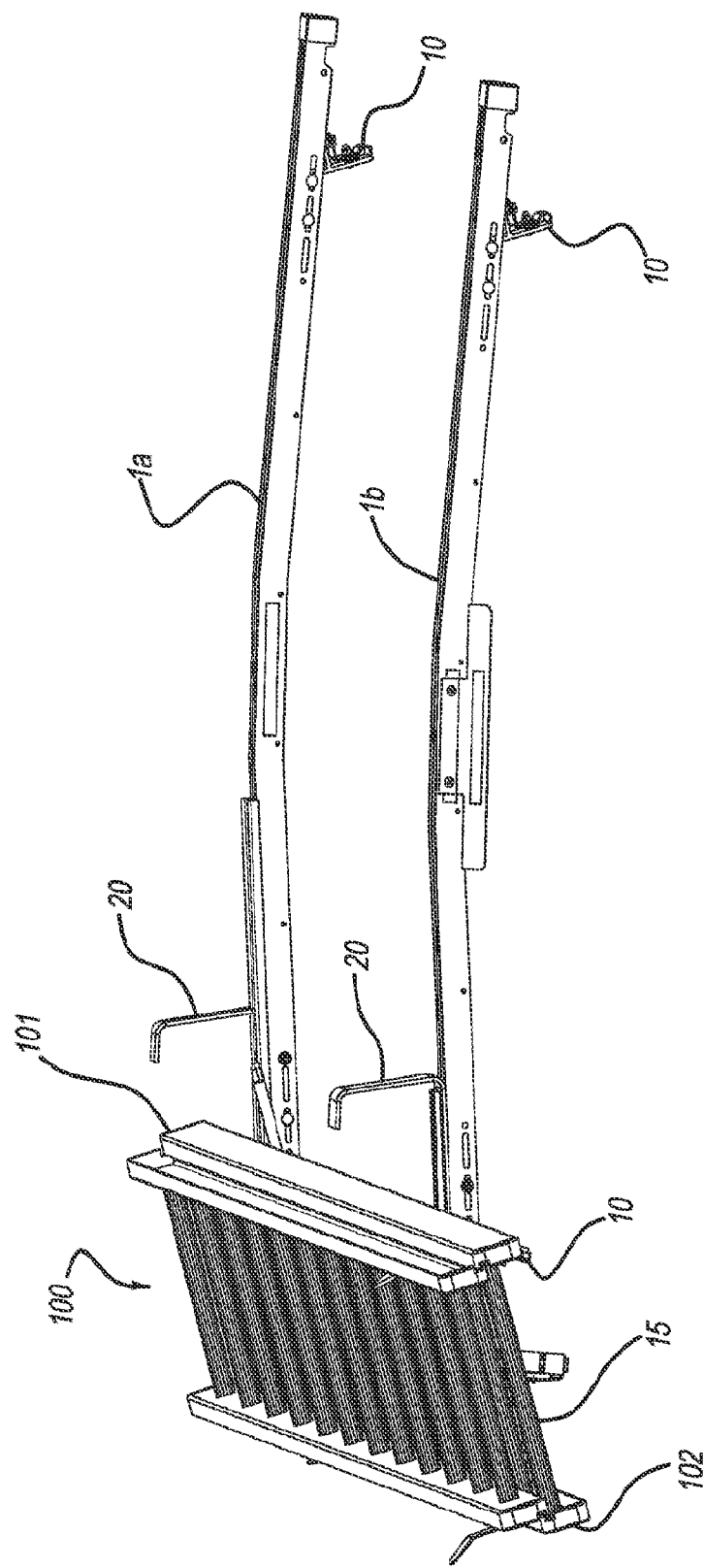
FIG. 7 is a perspective view of the ladder rack in a loading/unloading position.
Figure 8:
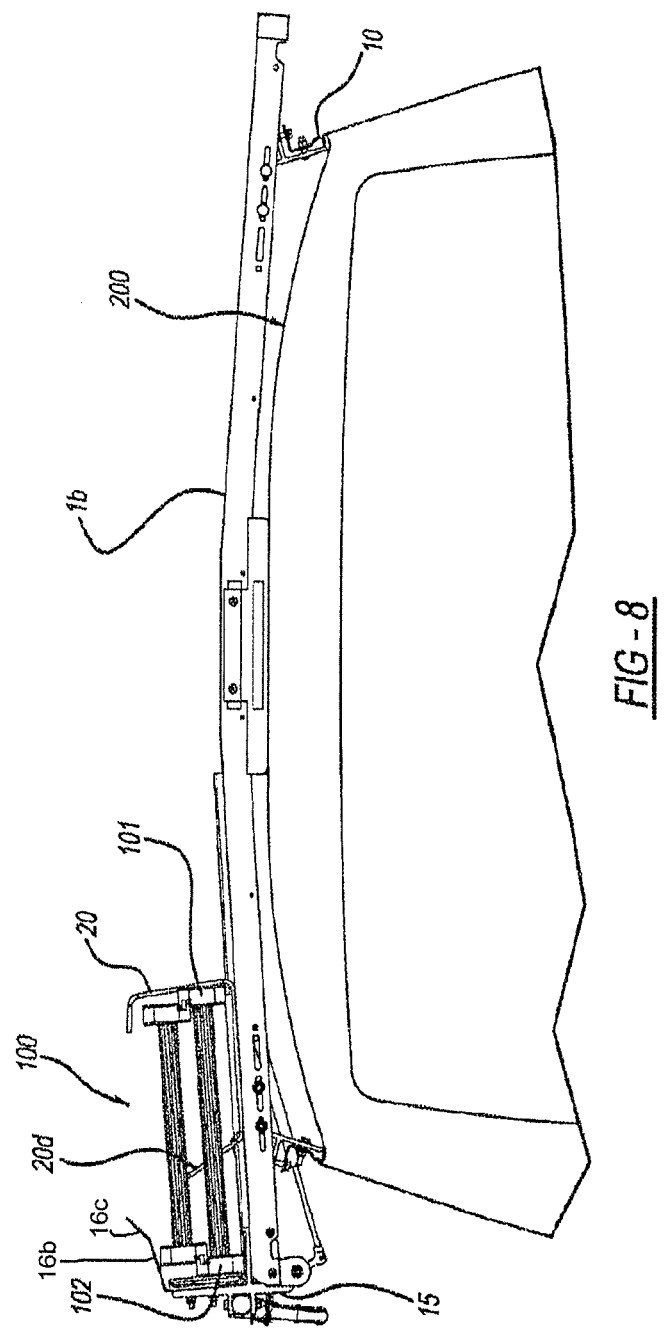
FIG. 8 is a cross-sectional view of the ladder rack on a vehicle body in a stowage position.

A method of loading a ladder 100 onto the ladder rack 110 when the same is in the loading/unloading position thereof (FIG. 6) is described hereafter. The methodology begins with the step of placing an inboard side-rail 101 of the ladder on the cross bows 1a, 1b. The methodology advances to the step of positioning the inboard side-rail 101 so that the inboard side-rail 101 is on the cross bows 1a, 1b between the pivot brackets 15 and the stationary brackets 20 (FIG. 6), while an opposite side-rail 102 is positioned on the pivot brackets 15 (FIG. 6). The methodology advances further while in the existing position, and with the handle 30 in the deployed position thereof (FIG. 6), the ladder rack (and ladder) may be moved to the storage position (FIG. 7) with the step of manually operating the handle 30 to rotate the torsion bar 25 and, thus, pivot the pivot brackets 15 into the first position thereof (FIG. 7). In this position, it will be seen from FIG. 7 that the side-rails 101, 102 of the ladder 101 are captured between the stationary 20 and pivot 15 brackets so that the ladder is secured atop the vehicle 200. To unload the ladder from the vehicle 200, the foregoing process is reversed to bring the pivot brackets 15 into the second position thereof (FIG. 6).

Many modifications and variations of the present disclosure are possible n light of the above teachings. Therefore, within the scope of the appended claim, the present disclosure may be practiced other than as specifically described.

The invention claimed is:

1. A ladder rack for a vehicle comprising:
    a frame assembly mountable to the vehicle, and having at least two cross bows extending longitudinally between opposite first and second ends;
    a pivot bracket pivotally coupled to the first end of each of the cross bows and adapted to support only one side rail of a ladder, and each pivot bracket is pivotally moveable between a first position corresponding to the stowage position and a second position corresponding to the loading/unloading position;
    a variably positionable ladder grip coupled to the pivot bracket to accommodate variously sized ladders;
    a stationary bracket disposed on each of the cross bows intermediate the first and second ends thereof, wherein each stationary bracket abuts another side rail of a ladder in the stowage position;
    a torsion bar interconnecting the pivot brackets; and
    a manually operable handle coupled to one of the torsion bar or the pivot bracket for moving the pivot brackets between the stowage position and the loading/unloading position.

2. The vehicle ladder rack according to claim 1, further comprising a spring interconnecting each of the cross bows and said pivot bracket, wherein the spring biases the pivot bracket to the first position thereof.

3. The vehicle ladder rack according to claim 1, wherein each of the cross bows defines a sliding track therein.

4. The vehicle ladder rack according to claim 1, wherein the vehicle is an automobile.

5. The vehicle ladder rack according to claim 1, wherein each of the cross bows include a sliding track having an elongate slot for securing a component within the sliding track.

6. The vehicle ladder rack according to claim 5, wherein the stationary bracket is secured to the sliding track via the elongate slot.

7. The vehicle ladder rack according to claim 6, wherein the stationary bracket is adjustably positioned along the length of one of the cross bows.

8. The vehicle ladder rack according to claim 1, further comprising a clamp coupled to the torsion bar to receive and removably capture therein a portion of the handle.

9. The vehicle ladder rack according to claim 8, wherein the clamp is a C-shaped bracket.

10. The vehicle ladder rack according to claim 8, wherein the clamp includes a pair of opposed tabs proximate the clamp opening, each tab including a bore there through for receiving a securement feature, wherein upon engagement with the bores the securement feature prevents the removal of the handle from the clamp.

11. The vehicle ladder rack according to claim 10, wherein the securement feature is a pin.

12. The vehicle ladder rack according to claim 11, wherein the pin is tethered to the torsion bar to prevent its loss, and the pin including a latch for selectively attaching a free end of the pin to further secure the pin upon engagement with the bores.

13. The vehicle ladder rack according to claim 1, wherein the pivot bracket has a direction which is essentially perpendicular to the cross bows during a first position, and the pivot bracket extends in an essentially horizontal direction to the cross bows during a second position.

14. The vehicle ladder rack according to claim 13, wherein the first position is the stowage position and the second position is the loading/unloading position.

15. The vehicle ladder rack according to claim 1, wherein the ladder grip is coupled to the pivot bracket via a pivot bracket receiving portion.

16. The vehicle ladder rack according to claim 15, wherein the ladder grip includes a base, a first ladder grip portion, a second ladder grip portion, and a pair of wings, wherein the ladder grip base couples to the pivot bracket via the pivot bracket receiving portion, the first ladder grip portion extends from an end portion of the ladder grip base in a first upward direction above a ladder situated in a storage position, the second ladder grip portion extends in a second upward direction above the ladder situated in the stowage position, and the pair of wings extend in an upward direction from respective longitudinal end portions of the ladder grip base.

17. The vehicle ladder rack according to claim 16, wherein the second upward direction has a greater vertical angle than the first upward direction in relation to the base.

18. The vehicle ladder rack according to claim 1, wherein the ladder grip includes a base, an extended ladder grip portion, and a pair of wings, wherein the ladder grip base couples to the pivot bracket via the pivot bracket receiving portion, the extended ladder grip portion extends from an end portion of the ladder grip base in an upward direction above a ladder situated in the stowage position, and the pair of wings extend in an upward direction from respective longitudinal end portions of the ladder grip base.

19. The vehicle ladder rack according to claim 1, wherein a generally C-shaped bracket is provided on the torsion bar, the C-shaped bracket is dimensioned to receive and removably capture therein a portion of the handle to secure the handle in the stowage position thereof.

20. A method for loading a ladder onto a ladder rack, comprising:
 placing an inboard side-rail of the ladder onto a plurality of cross bows;
 positioning the inboard side-rail so that the inboard side-rail is between a plurality of pivot brackets and stationary brackets while an opposite side-rail is positioned on the pivot brackets; and
 manually operating a handle while the handle is in a deployed position to rotate a torsion bar and thereby pivot the pivot brackets into a first position, wherein the inboard and opposite side-rails are captured between the stationary and pivot brackets so that the ladder is in a secured positioned.

\* \* \* \* \*